United States Patent Office 3,022,166
Patented Feb. 20, 1962

3,022,166
PHOTOGRAPHIC PRODUCTS, PROCESSES
AND COMPOSITIONS
Milton Green, Newton Highlands, and Myron S. Simon, Newton Center, Mass., assignors to Polaroid Corporation, Cambridge, Mass., a corporation of Delaware
No Drawing. Filed Mar. 28, 1957, Ser. No. 649,019
13 Claims. (Cl. 96—61)

This invention relates to novel chemical compounds and more particularly to certain novel chemical compounds useful as photographic developing and antistain agents, and products and processes utilizing said compounds.

One object of this invention is to provide novel chemical compounds and suitable syntheses for their preparation.

Another object of the invention is to provide novel photographic developing agents which possess various rates of mobility, and compositions containing them, for the development of silver halide emulsions.

A further object is to provide novel photographic antistain agents for use in color processes.

Other objects of this invention will in part be obvious and will in part appear hereinafter.

The invention accordingly comprises the several steps and the relation and order of one or more of such steps with respect to each of the others, and the products and compositions possessing the features, properties and the relation of elements which are exemplified in the following detailed disclosure and the scope of the application of which will be indicated in the claims.

The following detailed description will give a fuller understanding of the nature and objects of the invention.

The novel compounds of this invention may be represented by the formulae:

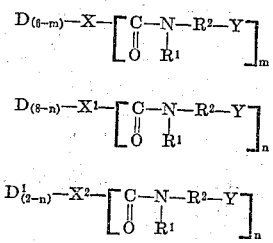

wherein X is a benzene nucleus; $X^1$ is a naphthalene nucleus; $X^2$ may be a single valence bond, i.e., a covalent bond or a bivalent hydrocarbon radical; each D may be a hydrogen, alkyl such as methyl, ethyl, propyl, dodecyl, etc. or a carboxyl group, i.e.,

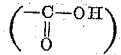

$D^1$ may be a hydrogen or carboxyl group; $m$ is a number from 1 to 6 inclusive, preferably 2 to 6 inclusive, and more preferably 4; $n$ is a number from 1 to 2 inclusive; $R^1$ may be a hydrogen, alkyl, or aryl group; $R^2$ may be a single valence bond, i.e., a covalent bond, or a bivalent hydrocarbon radical; and each Y is a 2,5-dihydroxyphenyl, 2,3-dihydroxyphenyl, or a 3,4-dihydroxyphenyl group which may be further substituted by alkyl or halogen groups.

The expression "bivalent hydrocarbon radical" refers to hydrocarbon groups wherein the two free valences are satisfied by different atoms. As examples of bivalent organic radicals comprehended by the symbols, $X^2$ and $R^2$ above, mention may be made of alkylene groups such as methylene, ethylene, propylene, isopropylene, i.e.,

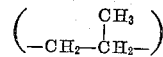

octylene, etc., alkarylene groups such as

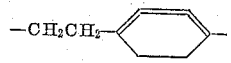

as well as diarylalkylene groups such as

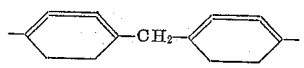

As an example of a suitable acid which may be employed to give compounds within the scope of the above formula where $X^2$ is a single valence bond, mention may be made of oxalic acid.

As examples of the

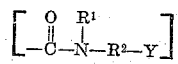

radical in the above formulae, mention may be made of the following:

(1)
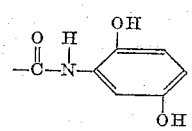

(2)
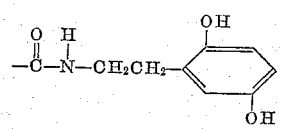

(3)
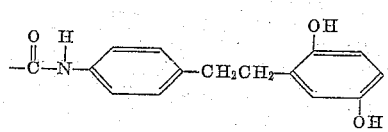

(4)
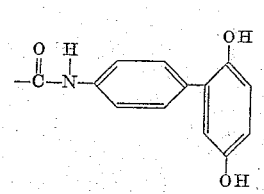

In the preferred embodiment, X is a benzene nucleus and $m$ is a number from 2 to 6 inclusive. Such compounds may be represented by the formula:

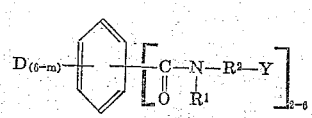

wherein D, $R^1$, $R^2$ and Y have the same meaning as above.

The preferred compound of this invention is $N,N^1,N^2$, $N^3$-tetra-[4'-(2'',5''-dihydroxyphenethyl)-phenyl] - pyromellitamide of the formula:

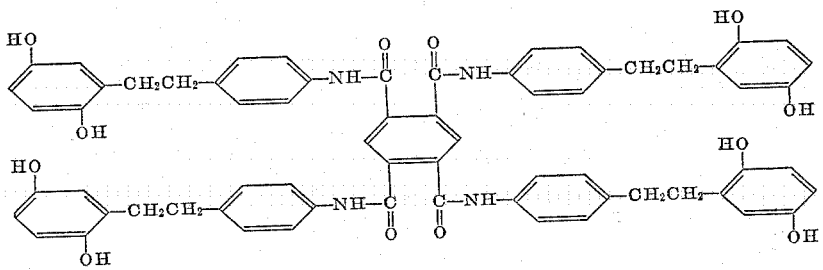

Another useful compound within the scope of this invention is N,N¹-bis - [4 - (2',5' - dihydroxybiphenyl)]-sebacamide of the formula:

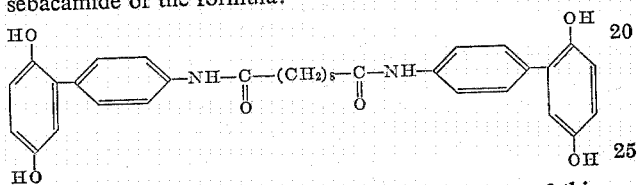

Still another useful compound within the scope of this invention is N,N¹-bis - [4 - (2',5' - dihydroxyphenethyl)-phenyl]-sebacamide of the formula:

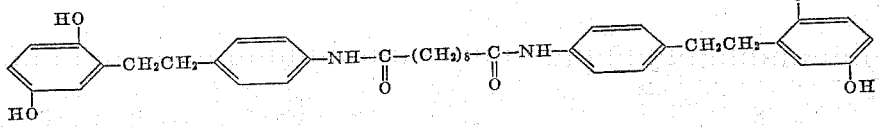

One method of preparing compounds within the scope of this invention is by condensing a suitable acid chloride such as that represented by the formula:

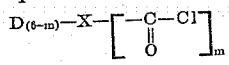

wherein D, X and $m$ have the same meaning as above, e.g., pyromellityl chloride, with a suitable amine or mixture of amines containing the appropriate —$R^2$—Y radical, e.g., p-aminophenethyl-hydroquinone, or a mixture of p-aminophenethyl-hydroquinone and p-aminophenyl-hydroquinone. The amine salts may also be used.

Another method of preparing compounds within the scope of this invention is by condensing a suitable acid anhydride, e.g., phthalic anhydride, with the appropriate amine or amines.

Still another method of preparing compounds within the scope of this invention is by condensing a suitable acid, e.g., oxalic acid, sebacic acid, etc., with the appropriate amine or amines.

The following examples illustrate the preparation of compounds within the scope of this invention and are given as illustrations only.

Example 1

5.3 g. of p-aminophenethyl-hydroquinone-hydrobromide (prepared as described in the copending application of Elkan R. Blout et al., Serial No. 612,051, filed September 25, 1956) is dissolved in 25 cc. of pyridine and added to 0.9 g. of pyromellityl chloride in 25 cc. of pyridine. The above mixture is refluxed for one-half hour and cooled. The reaction product is separated by precipitating in dilute aqueous hydrochloric acid and filtering. The precipitate is purified by redissolving in aqueous sodium hydroxide under a blanket of nitrogen and reprecipitating it in dilute aqueous hydrochloric acid. The precipitate is filtered and dried to yield 2 g. of a developer having a nitrogen analysis of 4.8% and believed to be N,N¹,N²,N³-tetra-[4'-(2'',5''-dihydroxyphenethyl)-phenyl]-pyromellitamide hydrochloride, possibly mixed with a small amount of the tri-substituted product.

Example 2

10 g. of p-aminophenyl-hydroquinone-O,O'-diacetate hydrochloride is placed in an aqueous solution containing excess sodium acetate. The free base is extracted from the aqueous solution with ether, and the ether solution is dried over magnesium sulfate. 1 cc. of pyridine and 2.4 g. of sebacyl chloride are added to the ether solution and the reaction is allowed to proceed for 2½ hours at room temperature.

At the end of the reaction period, the ether is driven off and the acetate radicals are hydrolyzed off, under nitrogen, by dissolving the dried material in an aqueous ethanol solution of potassium hydroxide, and subjecting it to intermittent shaking and heating over a steam bath for a few minutes.

The reaction product is cooled and then precipitated by adding hydrochloric acid. Upon filtering, washing and drying, a 3 g. yield of N,N¹-bis-[4-(2',5'-dihydroxybiphenyl)]-sebacamide hydrochloride is obtained as a light colored solid melting at 195–200° C.

An example of a suitable developer composition containing a compound of this invention and given for purposes of illustration only is:

Example 3

An aqueous composition is prepared comprising:

| | Percent |
|---|---|
| Sodium carboxymethyl cellulose | 4.5 |
| Potassium bromide | 0.2 |
| Sodium hydroxide | 3.0 |
| N,N¹-bis-[4-(2',5' - dihydroxyphenethyl) - phenyl]-sebacamide | 1.0 |

When spread in a thin layer between an exposed negative, such as that employed in Polaroid Land Picture Roll, Type 41, and a suitable spreading sheet, this developer composition is found to have substantially fully developed the negative in approximately one minute.

It will be understood that it is within the scope of this invention to vary the developer composition given in Example 3. The percentage of ingredients may be varied to suit particular needs. In cases where the negative is to be developed by immersion, the film-forming materials, e.g., the sodium carboxymethyl cellulose, may be omitted. Alkaline materials such as sodium carbonate, diethyl amine, etc. may be used in place of the sodium hydroxide. It is further contemplated that other photographic reagents, such as silver halide solvents, preservatives, etc. may be added when desired.

The novel developer compositions of this invention are by no means limited to formulations in which a single developing agent is incorporated; where desired, mixtures of these compounds may be used. An example of such a composition would be one in which the developing agents have an average of

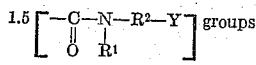 groups

Further, the use of the developing agents of this invention is in no way restricted to incorporating them into developing compositions; where desired, they may be employed in photosensitive elements, e.g., by placing them in or behind a silver halide emulsion layer.

As noted previously, the novel compounds of this invention possess various rates of mobility in photographic processes. In general, the relative rate of mobility of compounds within the scope of this invention will vary inversely with the number of amide groups in the molecule. Thus, compounds of a desired mobility may be made by varying the equivalents of amine reacted.

The novel developing agents of this invention which possess relatively higher mobility are useful in diffusion-transfer reversal processes, both dye and silver, and are especially useful in such photographic processes wherein it is desired to eliminate or minimize the need for washing or stabilizing operations in liquid baths subsequent to the formation of the silver print. Example of such processes are disclosed in U.S. Patent No. 2,647,056 to Edwin H. Land. The utility of the developers of this invention, however, is by no means limited to diffusion-transfer reversal processes for they may be satisfactorily employed in conventional multistage and multibath photographic processes either in black-and-white or color photography. Where the herein disclosed novel developing agents are employed in diffusion-transfer reversal processes of the type disclosed in the said patent to Edwin H. Land, the novel developer compositions of this invention may have incorporated therein as a further ingredient a silver halide solvent such as sodium thiosulfate. Thus, by adding sodium thiosulfate to the composition in Example 3 and using an image-receiving element, a positive print may be obtained. If the composition is to be applied to the emulsion by being spread thereon in a thin layer, it may also include a film-forming thickening agent such, for example, as a high molecular weight polymer, e.g., sodium carboxymethyl cellulose.

The novel developing agents of this invention which possess relatively low mobility are especially useful in photographic diffusion-transfer reversal processes in which it is desirable to exclude the developing agent from the image-receiving element or where it is desired to substantially prevent the developer from wandering from a particular portion of the photosensitive element. Such low mobility developers are particularly useful in the processes disclosed and claimed in the copending application of Howard G. Rogers, Serial No. 599,122, filed July 20, 1956, now abandoned.

In multilayer color processes, where antistain agents which are relatively immobile are required, the novel low mobility compounds of this invention are again useful.

The novel compounds of this invention are further useful as antioxidants in petroleum products, etc. They are also useful as intermediates.

Since certain changes may be made in the above processes, products and compositions without departing from the scope of the invention herein involved, it is intended that all matter contained in the above description shall be interpreted as illustrative and not in a limiting sense.

What is claimed is:

1. As a photographic developer composition for the formation of silver transfer prints, an aqueous solution comprising an alkaline material, a silver halide solvent, said solvent being capable of forming a soluble complex with silver halide, and at least one compound selected from the group consisting of compounds within the formulae:

(A)
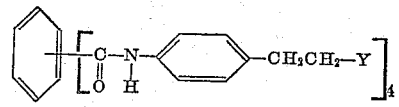

and (B) 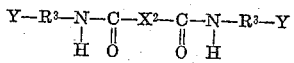

wherein $R^3$ is selected from the group consisting of phenylene and phenethyl groups, the ethyl substituent of said phenethyl group being linked to said Y radical, $X^2$ is an octylene radical and Y is selected from the group consisting of ortho-dihydroxyphenyl and para-dihydroxyphenyl radicals.

2. A developer composition as defined in claim 1 including a film-forming, viscosity-increasing compound.

3. As a novel photographic developer composition for the formation of silver transfer prints, an aqueous solution comprising an alkaline material, a silver halide solvent, said solvent being capable of forming a soluble complex with silver halide, and $N,N^1,N^2,N^3$-tetra-[4'-(2'',5''-dihydroxyphenethyl)-phenyl]-pyromellitamide.

4. As a novel photographic developer composition for the formation of silver transfer prints, an aqueous solution comprising an alkaline material, a silver halide solvent, said solvent being capable of forming a soluble complex with silver halide, and $N,N^1$-bis-[4-(2',5'-dihydroxybiphenyl)]-sebacamide.

5. As a novel photographic developer composition for the formation of silver transfer prints, an aqueous solution comprising an alkaline material, a silver halide solvent, said solvent being capable of forming a soluble complex with silver halide, and $N,N^1$-bis-[4-(2',5'-dihydroxyphenethyl)-phenyl]-sebacamide.

6. A photographic product comprising a support bearing on one surface a plurality of layers including a silver halide emulsion layer, at least one layer containing at least one compound selected from the group consisting of compounds within the formulae:

(A)
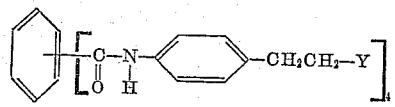

and (B) 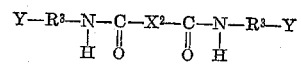

wherein $R^3$ is selected from the group consisting of phenylene and phenethyl groups, the ethyl substituent of said phenethyl group being linked to said Y radical, $X^2$ is an octylene radical and Y is selected from the group consisting of ortho-dihydroxyphenyl and para-dihydroxyphenyl radicals.

7. A photographic product comprising a film support, said film support having superposed on one surface of said support a plurality of layers including a silver halide emulsion layer, at least one of said layers containing $N,N^1,N^2,N^3$ - tetra - [4' - (2'',5'' - dihydroxyphenethyl) - phenyl]-pyromellitamide.

8. A photographic product comprising a film support, said film support bearing on one surface a plurality of layers including a silver halide emulsion layer, at least one of said layers containing $N,N^1$-bis-[4-(2',5'-dihydroxybiphenyl)]-sebacamide.

9. A photographic product comprising a film support, said film support bearing on one surface a plurality of layers including a silver halide emulsion layer, at least one of said layers containing $N,N^1$-bis-[4-(2',5'-dihydroxyphenethyl)-phenyl]-sebacamide.

10. A process of developing an exposed silver halide emulsion which comprises treating said emulsion for a sufficient time to develop the latent image to silver with an aqueous solution comprising an alkaline material and at least one compound selected from the group consisting of compounds within the formulae:

(A) 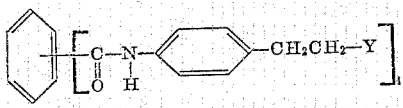

and (B) 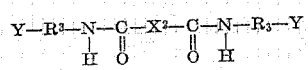

wherein $R^3$ is selected from the group consisting of phenylene and phenethyl groups, the ethyl substituent of said phenethyl group being linked to said Y radical, $X^2$ is an octylene radical and Y is selected from the group consisting of ortho-dihydroxyphenyl and para-dihydroxyphenyl radicals.

11. A method of developing an exposed silver halide emulsion which comprises treating said emulsion with an aqueous solution comprising an alkaline material and $N,N^1,N^2,N^3$ - tetra - [4' - (2'',5'' - dihydroxyphenethyl)-phenyl]-pyromellitamide for a sufficient time to develop the latent image to silver.

12. A method of developing an exposed silver halide emulsion which comprises treating said emulsion with an aqueous solution comprising an alkaline material and $N,N^1$-bis-[4-(2',5'-dihydroxybiphenyl)]-sebacamide for a sufficient time to develop the latent image to silver.

13. A method of developing an exposed silver halide emulsion which comprises treating said emulsion with an aqueous solution comprising an alkaline material and $N,N^1$ - bis - [4 - (2',5' - dihydroxyphenethyl) - phenyl]-sebacamide for a sufficient time to develop the latent image to silver.

References Cited in the file of this patent
UNITED STATES PATENTS

| | | |
|---|---|---|
| 2,515,147 | Wasley | July 11, 1950 |
| 2,610,122 | John et al. | Sept. 9, 1952 |
| 2,670,374 | Cusic | Feb. 23, 1954 |
| 2,704,713 | Bent et al. | Mar. 22, 1955 |
| 2,713,594 | Sauer | July 19, 1955 |
| 2,735,765 | Loria et al. | Feb. 21, 1956 |

UNITED STATES PATENT OFFICE
CERTIFICATE OF CORRECTION

Patent No. 3,022,166            February 20, 1962

Milton Green et al.

It is hereby certified that error appears in the above numbered patent requiring correction and that the said Letters Patent should read as corrected below.

Column 2, the formula at line 10 should appear as shown below instead of as in the patent:

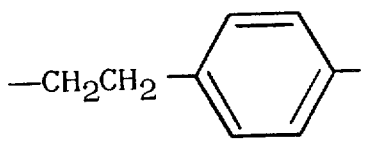

same column 2, the formula at line 15 should appear as shown below instead of as in the patent:

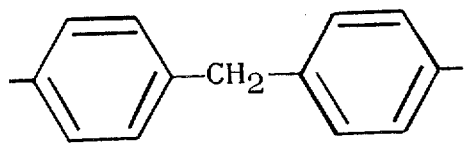

column 7, the formula at line 11 should appear as shown below instead of as in the patent:

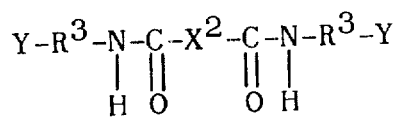

Signed and sealed this 5th day of May 1964.

(SEAL)
Attest:

ERNEST W. SWIDER
Attesting Officer

EDWARD J. BRENNER
Commissioner of Patents